3,240,798
OXIDATION OF ACETALS TO ESTERS
Donald L. Heywood and Benjamin Phillips, Charleston,
W. Va., assignors to Union Carbide Corporation, a
corporation of New York
No Drawing. Filed Oct. 31, 1961, Ser. No. 148,861
8 Claims. (Cl. 260—476)

This invention relates to a novel process for the preparation of esters. In one aspect, this invention is directed to the oxidation of acetals to esters with peracetic acid.

Heretofore, peracids, such as peracetic acid, have been employed in the oxidation of olefinically unsaturated aliphatic and alicyclic compounds to the corresponding epoxides. The epoxidation is conveniently effected by charging the unsaturated starting material to a reaction vessel and adding the appropriate quantity of peracetic acid in a dropwise manner. The reaction is allowed to proceed for a time sufficient to consume approximately the theoretical quantity of peracetic acid needed to effect epoxidation. In each instance, the major product recovered is the anticipated epoxide.

It has recently been discovered that an unexpected reaction occurs when certain unsaturated acetals, such as, crotonaldehyde di-n-butyl acetal, are oxidized with peracetic acid at a higher reaction temperature than that usually required for epoxidation of a double bond. The major product was not the expected epoxide, but rather the unsaturated ester, butyl crotonate. Moreover, it was observed that a strong acid, such as sulfuric acid, catalyzed the reaction to the virtually complete exclusion of any epoxidation. The reaction was also found to be applicable to the preparation of saturated esters from the corresponding saturated acetals.

It is accordingly an object of the present invention to provide a novel process for the preparation of esters from acetals. Another object of this invention is to provide a novel process for the acid-catalyzed oxidation of acetals to esters with peracetic acid. A further object is to provide a novel process for the preparation of certain unsaturated esters from acetals and dioxolanes under relatively mild reaction conditions. Another object is to provide a process for the preparation of esters from acetals in relatively high yields. These and other objects will readily become apparent to those skilled in the art in the light of the teachings herein set forth.

In its broad aspect, the present invention is directed to a process for the preparation of esters from acetals. The process of the invention comprises contacting a saturated or unsaturated acetal with peracetic acid, at a temperature and for a period of time sufficient to cause the formation of the ester, and thereafter recovering the ester from the resulting reaction product mixture by a suitable technique such as distillation and the like.

While not wishing to be bound by any particular mechanism which favors the formation of the ester, a consideration of the possible factors will aid in understanding the invention. Although the oxidation of acetals to the corresponding acids by air or oxygen is known, in each instance the free acid is the exclusive or major product. In the instant process however, very little free acid was observed, and concentrations of any alcohol coproduct was undoubtedly not of sufficient magnitude for a mechanism involving formation of free acid followed by esterification.

It is possible that oxidation of the acetal to the ester proceeds through a hemiacetal peracetate (I) the formation of which would be catalyzed by strong acid

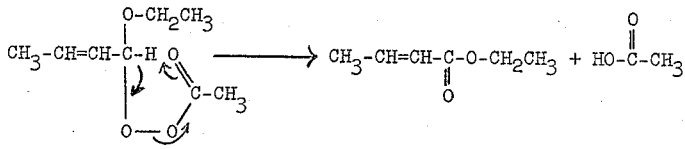

and which could decompose as indicated. A formal analogy is seen in the decomposition of acetaldehyde monoperacetate (II) to two

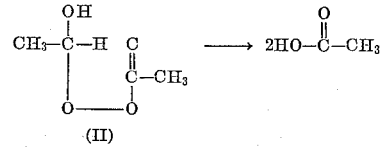

molecules of acetic acid. It has been observed that the oxidation to the ester proceeds most readily for those acetals in which an electron deficiency on the aldehydic carbon atom is stabilized by an adjacent unsaturated group. However, other mechanisms for oxidation of the acetal to the ester may be proposed and the aforesaid route is given only to aid in the understanding of the process of this invention.

In one embodiment, the present process is applicable to the preparation of saturated and unsaturated esters from non-cyclic acetals as illustrated by the following equation:

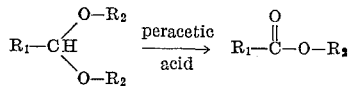

wherein $R_1$ is selected from the group consisting of 1,2-alkenyl and aryl-1,2-alkenyl radicals containing up to 18 carbon atoms, and more preferably up to 12 carbon atoms, and each $R_2$ is an alkyl radical containing up to 18 carbon atoms, and more preferably up to 12 carbon atoms. The process is particularly useful in the preparation of unsaturated esters from 2,3-olefinically unsaturated aldehyde acetals. For example, cinnamaldehyde diethyl acetal, crotonaldehyde dibutyl acetal were conveniently oxidized with peracetic acid to the corresponding ester, ethyl cinnamate, and butyl crotonate, in respective yields of 68 and 73 percent. Moreover, acetals of acrolein and methacrolein were also oxidized to the corresponding acrylate or methacrylate esters. For example, propenaldehyde diethyl acetal, propenaldehyde dibutyl acetal, propenaldehyde dihexyl acetal, 2-methylpropenaldehyde diethyl acetal, 2-methylpropenaldehyde dibutyl acetal, 2-methylpropenaldehyde dihexyl acetal where oxidized respectively to ethyl acrylate, butyl acrylate, hexyl acrylate, ethyl methacrylate, butyl methacrylate, and hexyl methacrylate. Esters can also be prepared from the saturated acetals, such as, for example, butyraldehyde diethyl acetal, benzaldehyde diethyl acetal, beta-phenyl-beta-ethoxypropionaldehyde diethyl acetal, and the like.

In a further embodiment of the instant invention, saturated and certain unsaturated cyclic acetals are also oxidized to the corresponding ester by peracetic acid. In particular, the 2,3-olefinically unsaturated dioxolanes can be conveniently oxidized to the ester as illustrated by the following equation:

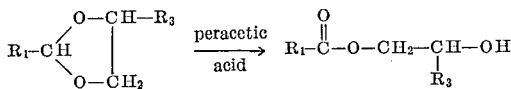

wherein $R_1$ is as previously defined and $R_3$ is selected from the group consisting of hydrogen and alkyl up to 18 carbon atoms and more preferably up to 12 carbon atoms. As indicated above, the process is particularly applicable to 2,3-olefinically unsaturated dioxolanes such as 2-($\beta$-styryl)-4-methyl-1,3-dioxolane, 2-(1-ethyl-1-pentenyl)-4-methyl-1,3-dioxolane, 2-(1-ethyl-1-pentenyl)-1,3-dioxolane, 2-isopropenyl-1,3-dioxolane, 2-(1-propenyl)-4-methyl-1,3-dioxolane, 2-(1-propenyl)-1,3-dioxolane, and the like.

In a preferred embodiment of the process of the present invention, the oxidation of the acetal compound is carried out at temperatures within the range of from about $-10°$ to about $120°$ C. However, in order to avoid undesirable side reaction and to provide a suitable reaction rate, temperatures in the range of from about $20°$ to about $70°$ C. are preferred. Although the oxidation of the acetal to the corresponding ester can be conducted in the absence of catalysts, the reaction was found to be catalyzed by strong acids, such as sulfuric acid, phosphoric, toluenesulfonic, and the like. Other acids can also be employed as long as they are inert to the reactants and resulting reaction products. When an acid such as sulfuric acid was employed, the yield of ester was found to be substantially higher than in the uncatalyzed reaction. The catalyst is preferably employed in a concentration of from about 0.1 to about 5.0 weight percent based on the starting acetal. In the practice of the invention, the acetal starting material and catalyst are conveniently charged to a reaction vessel and the appropriate quantity of peracetic acid is added. The mole ratio is not necessarily critical and can be varied over a wide range. The reaction is allowed to proceed for a time sufficient to consume approximately the theoretical quantity of peracetic acid needed to effect oxidation. The amount of peracetic acid consumed can be determined by periodic tests for peracetic acid. Usually from about one to about ten hours is sufficient for the reaction to be completed at the preferred temperature. Finally, the reaction mixture is subjected to conventional recovery procedures to isolate the ester. Extraction with a suitable solvent, continuous distillation, or distillation under reduced pressures all are applicable to the recovery of the ester compound.

Pressure is in no wise critical and the reaction can be effected at atmospheric, subatmospheric or superatmospheric pressure.

The following examples are illustrative of the present invention:

EXAMPLE I

*Oxidation of crotonaldehyde dibutyl acetal*

117 grams of an ethyl acetate solution containing 26.8 grams (0.352 mole) of peracetic acid was added over a period of 1 hour to 64 grams (0.32 mole) of crotonaldehyde dibutyl acetal. The temperature was maintained at $60°$ C., and titration for peracetic acid at the end of this period indicated that the theoretical amount was consumed. The cooled reaction mixture was fed into ethylbenzene under reflux at a pressure of 35 millimeters of mercury, and ethylbenzene, acetic acid, and ethyl acetate were removed at the head of the column. Fractionation of the residue gave 33 grams (73 percent yield) of butyl crotonate having a boiling point of $75$–$80°$ C. at a pressure of 20 millimeters of mercury. A redistilled sample exhibited the following properties: boiling point $75$–$78°$ C. at 20 millimeters of mercury, refractive index, $n\ 30°/D = 1.4286$. Analysis of the butyl crotonate showed the following: Calculated for $C_8H_{14}O_2$: C, 67.57; H, 9.93; saponification equivalent 142. Found: C, 68.26; H, 9.92; saponification equivalent 139.5.

A portion of the butyl crotonate obtained above was saponified and acidified in the usual fashion, giving crystalline crotonic acid, melting point and mixed melting point with authentic trans-crotonic acid, $69$–$72°$ C.

In a similar manner the acrylate and methacrylate esters can be prepared from the corresponding acrylic acetals and methacrylic acetals.

EXAMPLE II

*Oxidation of n-butyraldehyde diethyl acetal*

To 10 grams (0.07 mole) of n-butyraldehyde diethyl acetal containing 1 drop of concentrated sulfuric acid was added 23 grams of an ethyl acetate solution containing 5.7 grams (0.075 mole) of peracetic acid over a period of 30 minutes. The mixture was warmed to $40°$ C. and held there for 11 hours, at the end of which time titration for peracetic acid indicated a consumption of 99.3 percent of the theoretical. The cooled solution was washed with aqueous sodium carbonate, the layers were separated, and the organic layer was fractionated. There was obtained 4.0 grams of pure ethyl butyrate having a boiling point of $118$–$120°$ C. and a refractive index, $n\ 30°/D$, 1.3864. Additionally, there was obtained 6.0 grams of a mixed ethyl acetate and ethyl butyrate fraction, boiling point $80$–$118°$ C., which, by gas chromatographic analysis, contained 1.6 grams of ethyl butyrate. The total yield was 5.6 grams which represented 69 percent. The infrared spectrum of the isolated ethyl butyrate was identical to the standard (Sadtler) spectrum.

EXAMPLE III

*Oxidation of benzaldehyde diethyl acetal*

54 grams of benzaldehyde diethyl acetal (0.3 mole) containing 2 drops of concentrated sulfuric acid was treated with 109 grams of an ethyl acetate solution containing 26.6 grams (0.35 mole) of peracetic acid. The addition required 3 hours, during which time the temperature was maintained at $26°$–$40°$ C. by ice-water cooling. After standing for 20 hours, the mixture was titrated for peracid, and it was found that the theoretical amount had been consumed. The solution was worked up as in the preceding examples to give 41 grams of ethyl benzoate having a boiling point of $87°$–$90°$ C. at a pressure of 10 millimeters of mercury and a refractive index, $n\ 30°/D$, 1.4993. The infrared spectrum was identical to that of an authentic specimen. The yield was 90 percent of the theoretical value. From the distillation residue a small amount, approximately 0.5 gram, of benzoic acid was isolated.

EXAMPLE IV

*Oxidation of $\beta$-phenyl-$\beta$-ethoxypropionaldehyde diethyl acetal*

To 37 grams (0.146 mole) of $\beta$-phenyl-$\beta$-ethoxypropionaldehyde diethyl acetal was added 67 grams of an ethyl acetate solution containing 15 grams (0.198 mole) of peracetic acid. The mixture was held at $40°$–$60°$ C. for 7 hours. At this point 42 percent of the theoretical amount of peracid was consumed. Upon adding 4 drops of concentrated sulfuric acid the reaction became exothermic and warmed to $92°$ C. After cooling, the solution was treated with 1 drop of cobalt naphthenate to destroy peroxides and 1.34 grams of sodium acetate to neutralize the sulfuric acid. Direct distillation of the reaction mixture gave 20 grams of ethyl β-phenyl-β-ethoxypropionate having a boiling point of 122°–130° C. at a pressure of 10 millimeters of mercury and a refractive index, n 30°/D, 1.4866.

The ester was saponified with potassium hydroxide in ethanol-water in the usual fashion to give crystalline β-phenyl-β-ethoxypropionic acid having a melting point of 74°–75° C. Analysis of the acid showed the following: Calculated for $C_{11}H_{14}O_3$: C, 68.02; H, 7.27; equivalent weight, 194.2. Found: C, 68.47; H, 7.34; equivalent weight, 195.3. The melting point reported in the literature for this acid is 75° C.

EXAMPLE V

*Oxidation of 2-(β-styryl)-4-methyl-1,3-dioxolane*

To 76 grams (0.4 mole) of 2-(β-styryl)-4-methyl-1,3-dioxolane containing 0.76 gram of sulfuric acid was added with stirring 157 grams of an ethyl acetate solution containing 38.0 grams (0.5 mole) of peracetic acid over a period of 1 hour. The reaction was exothermic from the outset, and the temperature was maintained at 25°–33° C. by ice-water cooling. After an additional 4 hours at 30° C. titration for peracetic acid indicated the theoretical amount had been consumed. Sodium acetate, 1.25 grams, was added to neutralize the sulfuric acid. Distillation through a glass helix-packed column gave, after recovery of solvent and acetic acid, 23 grams of impure propylene glycol monocinnamate having a boiling point of 195° C. at a pressure of 1.25 millimeters of mercury and a refractive index, n 30°/D, of 1.5483. The yield was 28 percent of the theoretical value. Upon analysis the following was obtained: Calculated for $C_{12}H_{14}O_3$: C, 69.88; H, 6.84. Found: C, 71.92; H, 7.25.

Although the invention has been illustrated by the preceding examples, it is not to be construed as limited to the materials employed therein, but rather the invention encompasses the generic area as hereinbefore disclosed. Various modifications and embodiments of this invention can be made without departing from the spirit and scope thereof.

What is claimed is:

1. A process for the preparation of an ester of the formula:

$$R_1-\overset{O}{\overset{\|}{C}}-O-R_2$$

wherein $R_1$ is selected from the group consisting of 1,2-alkenyl and aryl-1,2-alkenyl radicals containing up to 18 carbon atoms, and $R_2$ is an alkyl radical containing up to 18 carbon atoms, which comprises contacting peracetic acid with an acetal of the formula:

$$R_1-CH\diagup^{O-R_2}_{\diagdown O-R_2}$$

wherein $R_1$ and $R_2$ are as defined above, at a temperature of from 20° C. to 120° C. for a period of time ranging from 1 to 10 hours, and recovering said ester from the resulting product mixture.

2. A process as claimed in claim 1 wherein $R_1$ is selected from the group consisting of 1,2-alkenyl and aryl-1,2-alkenyl radicals containing up to 12 carbon atoms, and $R_2$ is an alkyl radical containing up to 12 carbon atoms.

3. A process for the preparation of an ester of the formula:

$$R_1-\overset{O}{\overset{\|}{C}}-O-R_2$$

wherein $R_1$ is selected from the group consisting of 1,2-alkenyl and aryl-1,2-alkenyl radicals containing up to 12 carbon atoms, and $R_2$ is an alkyl radical containing up to 12 carbon atoms, which comprises contacting peracetic acid with an acetal of the formula:

$$R_1-CH\diagup^{O-R_2}_{\diagdown O-R_2}$$

wherein $R_1$ and $R_2$ are as defined above, in the presence of a catalytic amount of a strong acid at a temperature of from 20° C. to 70° C. for a period of time ranging from 1 to 10 hours, and recovering said ester from the resulting product mixture.

4. A process for the preparation of an ester of the formula:

$$R_1-\overset{O}{\overset{\|}{C}}-O-R_2$$

wherein $R_1$ is selected from the group consisting of 1,2-alkenyl and aryl-1,2-alkenyl radicals containing up to 12 carbon atoms, and $R_2$ is an alkyl radical containing up to 12 carbon atoms, which comprises contacting peracetic acid with an acetal of the formula:

$$R_1-CH\diagup^{O-R_2}_{\diagdown O-R_2}$$

wherein $R_1$ and $R_2$ are as defined above, in the presence of from 0.1 to 5.0 weight percent, based on the weight of acetal, of a catalyst selected from the group consisting of sulfuric acid, phosphoric acid and toluenesulfonic acid at a temperature of from 20° C. to 70° C. for a period of time ranging from 1 to 10 hours, and recovering said ester from the resulting product mixture.

5. A process for the preparation of an ester of the formula:

$$R_1-\overset{O}{\overset{\|}{C}}-O-CH_2-\underset{\underset{R_3}{|}}{C}H_2-OH$$

wherein $R_1$ is selected from the group consisting of 1,2-alkenyl and aryl-1,2-alkenyl radicals containing up to 18 carbon atoms, and $R_3$ is selected from the group consisting of hydrogen and alkyl radicals containing up to 18 carbon atoms which comprises contacting peracetic acid with an acetal of the formula:

$$R_1-CH\diagup^{O-CH-R_3}_{\diagdown O-CH_2}|$$

wherein $R_1$ and $R_3$ are as defined above, at a temperature of from 20° C. to 120° C. for a period of time ranging from 1 to 10 hours, and recovering said ester from the resulting product mixture.

6. A process as claimed in claim 5 wherein $R_1$ is selected from the group consisting of 1,2-alkenyl and aryl-1,2-alkenyl radicals containing up to 12 carbon atoms, and $R_3$ is selected from the group consisting of hydrogen and alkyl radicals containing up to 12 carbon atoms.

7. A process for the preparation of an ester of the formula:

$$R_1-\overset{O}{\overset{\|}{C}}-O-CH_2-\underset{\underset{R_3}{|}}{C}H_2-OH$$

wherein $R_1$ is selected from the group consisting of 1,2-alkenyl and aryl-1,2-alkenyl radicals containing up to 12 carbon atoms, and $R_3$ is selected from the group consisting of hydrogen and alkyl radicals containing up to 18 carbon atoms which comprises contacting peracetic acid with an acetal of the formula:

$$R_1-CH\diagup^{O-CH-R_3}_{\diagdown O-CH_2}|$$

wherein $R_1$ and $R_3$ are as defined above, in the presence of a catalytic amount of a strong acid at a temperature of from 20° C. to 70° C. for a period of time ranging from 1 to 10 hours, and recovering said ester from the resulting product mixture.

8. A process for the preparation of an ester of the formula:

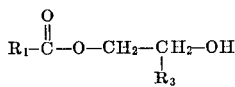

wherein $R_1$ is selected from the group consisting of 1,2-alkenyl and aryl-1,2-alkenyl radicals containing up to 12 carbon atoms, and $R_3$ is selected from the group consisting of hydrogen and alkyl radicals containing up to 18 carbon atoms which comprises contacting peracetic acid with an acetal of the formula:

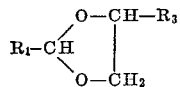

wherein $R_1$ and $R_3$ are as defined above in the presence of from 0.1 to 5.0 weight percent, based on the weight of acetal, of a catalyst selected from the group consisting of sulfuric acid, phosphoric acid and toluenesulfonic acid at a temperature of from 20° C. to 70° C. for a period of time ranging from 1 to 10 hours, and recovering said ester from the resulting product mixture.

References Cited by the Examiner

Kuhn et al.: J. Org. Chem., vol. 22, pages 774–6 (1957).

Rieche et al.: Ber. Deut. Chem., vol. 91, pages 1935–41 (1958).

Swern: Chem. Reviews, vol. 45, pp. 1–3 (1949).

LORRAINE A. WEINBERGER, *Primary Examiner.*

DURAL McCUTCHEN, *Examiner.*